US011271455B2

(12) United States Patent
Teofili

(10) Patent No.: US 11,271,455 B2
(45) Date of Patent: Mar. 8, 2022

(54) ELECTRIC MOTOR HAVING A COOLING DEVICE

(71) Applicant: ROLLS-ROYCE DEUTSCHLAND LTD & CO KG, Blankenfelde-Mahlow (DE)

(72) Inventor: Gabriele Teofili, Munich (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 202 days.

(21) Appl. No.: 16/631,012

(22) PCT Filed: Jul. 25, 2018

(86) PCT No.: PCT/EP2018/070152
§ 371 (c)(1),
(2) Date: Jan. 14, 2020

(87) PCT Pub. No.: WO2019/020684
PCT Pub. Date: Jan. 31, 2019

(65) Prior Publication Data
US 2020/0144894 A1 May 7, 2020

(30) Foreign Application Priority Data
Jul. 26, 2017 (DE) .................... 10 2017 212 798.8

(51) Int. Cl.
*H02K 9/06* (2006.01)
*B64D 27/24* (2006.01)
(Continued)

(52) U.S. Cl.
CPC ............... *H02K 9/06* (2013.01); *B64D 27/24* (2013.01); *B64D 33/08* (2013.01); *H02K 5/20* (2013.01); *H02K 9/22* (2013.01)

(58) Field of Classification Search
CPC . H02K 9/06; H02K 9/22; B64D 33/08; B64D 27/24
See application file for complete search history.

(56) References Cited

U.S. PATENT DOCUMENTS 1,700,840 A 2/1929 Gay
3,715,610 A 2/1973 Brinkman
(Continued)

FOREIGN PATENT DOCUMENTS

CN 1025450 C 7/1994
CN 102223010 A 10/2011
(Continued)

OTHER PUBLICATIONS

International Search Report and Written Opinion dated Oct. 11, 2018 for counterpart International Patent Application No. PCT/EP2018/070152.
(Continued)

*Primary Examiner* — Robert W Horn
(74) *Attorney, Agent, or Firm* — Shuttleworth & Ingersoll, PLC; Timothy J. Klima

(57) ABSTRACT

The invention relates to an electric motor with an integrated cooling device, which uses in particular bleed air as the primary coolant for cooling components of the stator and/or the rotor. Ambient air accelerated by the propulsion means, for example by a propeller, that is driven by the electric motor is used here as the bleed air. A channel system is integrated within the stator housing that has one or more channels for the targeted feed of the primary coolant to the component to be cooled. In the case of cooling the stator, a heat exchanger is also integrated within the stator housing, for example an annular heat exchanger that is arranged coaxially with respect to the stator and to which the primary coolant is fed. For cooling the rotor, a coolant passage is (Continued)

provided that also includes the air gap of the electric machine, for example.

14 Claims, 2 Drawing Sheets

(51) Int. Cl.
*B64D 33/08* (2006.01)
*H02K 5/20* (2006.01)
*H02K 9/22* (2006.01)

(56) References Cited

U.S. PATENT DOCUMENTS

| | | | | |
|---|---|---|---|---|
| 4,009,405 | A * | 2/1977 | Gleichman | H02K 9/06 |
| | | | | 310/58 |
| 5,403,216 | A * | 4/1995 | Salmi | B63J 2/12 |
| | | | | 440/6 |
| 9,902,478 | B2 * | 2/2018 | Lobell | B63H 21/17 |
| 10,443,620 | B2 * | 10/2019 | Hoefler | F01D 9/065 |
| 10,608,505 | B1 * | 3/2020 | Long | H02K 15/14 |
| 10,676,205 | B2 * | 6/2020 | Niergarth | B64D 27/24 |
| 10,693,350 | B2 * | 6/2020 | Sorge | H02K 11/40 |
| 10,784,750 | B2 * | 9/2020 | Gerstler | H02K 7/14 |
| 11,002,146 | B1 * | 5/2021 | O'Neill | F02C 7/32 |
| 11,059,599 | B2 * | 7/2021 | Rabbi | B64C 11/10 |
| 2005/0194847 | A1 | 9/2005 | Gromoll et al. | |
| 2006/0061221 | A1 * | 3/2006 | McAuliffe | F04D 29/584 |
| | | | | 310/59 |
| 2006/0061222 | A1 * | 3/2006 | McAuliffe | F04D 25/06 |
| | | | | 310/60 R |
| 2007/0295568 | A1 | 12/2007 | Vasilescu | |
| 2010/0026109 | A1 | 2/2010 | Hassett et al. | |
| 2010/0033042 | A1 | 2/2010 | Hassett et al. | |
| 2010/0295391 | A1 | 11/2010 | Perkins | |
| 2013/0293041 | A1 * | 11/2013 | Steinbauer | H02K 7/1815 |
| | | | | 310/52 |
| 2015/0288253 | A1 | 10/2015 | Wilson et al. | |
| 2015/0345501 | A1 * | 12/2015 | Uskert | H02K 29/00 |
| | | | | 417/420 |
| 2015/0377116 | A1 * | 12/2015 | Hall | F01P 5/04 |
| | | | | 123/41.49 |
| 2016/0347180 | A1 | 12/2016 | Steffani | |
| 2017/0040870 | A1 | 2/2017 | Ballauf | |
| 2017/0081007 | A1 * | 3/2017 | Kosso | H02K 21/00 |
| 2017/0254275 | A1 | 9/2017 | Klotzek | |
| 2019/0009917 | A1 | 1/2019 | Anton et al. | |
| 2019/0144126 | A1 * | 5/2019 | Groninga | B64D 27/24 |
| | | | | 244/53 B |
| 2019/0345949 | A1 * | 11/2019 | Harvey | B64D 35/02 |
| 2020/0144894 | A1 * | 5/2020 | Teofili | B64D 27/24 |
| 2020/0182087 | A1 * | 6/2020 | Belleville | B64D 33/08 |
| 2020/0373873 | A1 * | 11/2020 | Houshmand | H02K 15/125 |
| 2020/0385138 | A1 * | 12/2020 | Dionne | B64D 27/02 |
| 2021/0017879 | A1 * | 1/2021 | Banham | F01D 9/065 |
| 2021/0036580 | A1 * | 2/2021 | Cottrell | B64D 33/08 |
| 2021/0107635 | A1 * | 4/2021 | Mizumoto | B64D 33/08 |
| 2021/0179285 | A1 * | 6/2021 | Waitrich | F01P 7/08 |
| 2021/0194302 | A1 * | 6/2021 | Purchase | H02K 5/132 |

FOREIGN PATENT DOCUMENTS

| | | |
|---|---|---|
| DE | 102016206909 A1 | 10/2017 |
| DE | 102016218741 A1 | 3/2018 |
| EP | 0387743 A1 | 9/1990 |
| EP | 2600504 A1 | 6/2013 |
| EP | 2752976 A2 | 7/2014 |
| EP | 2774853 A1 | 9/2014 |
| EP | 3239044 A1 | 11/2017 |
| JP | S5747865 U | 3/1982 |
| WO | 2004030183 A1 | 4/2004 |
| WO | 2005062444 A1 | 7/2005 |
| WO | 2013152473 A1 | 10/2013 |
| WO | 2015078730 A1 | 6/2015 |
| WO | 2015106993 A1 | 7/2015 |
| WO | 2015128121 A1 | 9/2015 |
| WO | 2017025224 A1 | 2/2017 |

OTHER PUBLICATIONS

German Search Report dated Oct. 27, 2018 for counterpart German Patent Application No. 10 2017 212 798.8.

* cited by examiner

ELECTRIC MOTOR HAVING A COOLING DEVICE

This application is the National Phase of International Application PCT/EP2018/070152 filed Jul. 25, 2018 which designated the U.S.

This application claims priority to German Patent Application No. DE102017212798.8 filed Jul. 26, 2017, which application is incorporated by reference herein.

The invention relates to an electric motor with an integrated cooling device, which uses bleed air in particular as the primary coolant.

For the propulsion of aircraft, for example for aircraft or helicopters, concepts based on electric propulsion systems are investigated and used as an alternative to the common combustion engines. Such an electric or hybrid-electrical propulsion system usually has at least one electric machine which is operated as an electric motor to drive the propulsion means of the aircraft. Further provided are a corresponding source of electrical energy for supplying the electric motor and as a rule power electronics, with the help of which the electric motor is operated.

In the case of a hybrid electric drive system, an internal combustion engine is also provided, which is integrated in series or in parallel into the drive system and drives a generator, for example, which in turn provides electrical energy that can be stored in a battery, and/or an electric motor.

Such systems are described in WO2015106993A1, WO2015128121A1 or also in WO2017025224A1, for example.

The electric drives used for such mobile applications as well as the corresponding machines must be characterized by extremely high power densities in order to be able to generate the required power. While power densities of up to 2 kW/kg are sufficient for many technical applications, for example for the electrification of aviation, i.e. for electrically or hybrid-electrically driven aircraft, but also for other applications, in particular mobile applications, electric machines with power densities of at least 20 kW/kg are the aim. Such a machine and a rotor suitable for such a machine are described in DE102016206909, for example.

For the mentioned mobile applications, high power density electric motors are therefore required, whereby with increasing power density, in particular the cooling of the machine plays an essential role. This is usually achieved with the help of heat exchangers or, as explained in DE102016218741, also with the help of heat pipes. However, it is assumed from this that further approaches are needed to ensure highly efficient cooling of the electric motor.

It is therefore an object of the present invention to specify an alternative possibility for cooling an electric motor.

This object is achieved by the electric motor described herein. The present disclosure describes advantageous embodiments.

An electric motor assembly according to the invention for driving a propulsion means has a group of components as well as a cooling device for cooling at least one of the components, wherein the group comprises as components at least one stator with a stator housing as well as a rotor that can be rotated oppositely to the stator. A sheet metal package of the stator and a stator winding placed on the sheet metal package are arranged in the stator housing, and the rotor has at least one magnetic means, wherein the stator winding and the magnetic means are formed and arranged so that they interact electromagnetically with each other via an air gap formed between them when the electric motor is in the operating state. The cooling device has a means of creating, for example, a radially outward-oriented coolant flow of a preferably gaseous primary coolant and a channel system formed in the stator housing for receiving and subsequent carrying the coolant flow to the component to be cooled. In particular, the means for generating the coolant flow is formed and arranged so that it uses bleed air as the primary coolant, which is supplied to the means in particular, but not necessarily, by the propulsion means.

The "bleed air" used here as the primary coolant means in particular the air in the vicinity of the propulsion means which, when the electric motor is in the operating state, is accelerated in the axial direction towards the electric motor by the propulsion means that is driven by the electric motor, i.e. for example by the propeller. This air, which is used as the primary coolant, can of course include a certain, albeit comparatively small and neglected below, proportion of air that does not originate from the propeller. However, the significant proportion of the primary coolant, which is referred to here as "bleed air", should come from the propulsion means in the sense of the present application.

The concept underlying the invention is therefore that the already available bleed air is used as the primary coolant.

The propulsion means can be regarded as part of the electric motor assembly, wherein the rotor is connected to the propulsion means in such a way that the rotor drives the propulsion means when the electric machine is in the operating state. The consequence of this is that at least part of the bleed air to be used as the primary coolant is accelerated by the driven propulsion means towards the means for generating the coolant flow. Therefore, a comparatively fresh, clean and cool medium is always available for cooling the component to be cooled, which would be available anyway when the electric motor is in the operating state due to the function of the propulsion means, and which can now be used due to the advantageous arrangement.

The means for generating the coolant flow is embodied to first compress the bleed air that is supplied to it and to pass the compressed bleed air on to the channel system.

A heat exchanger is integrated in or on the stator housing, wherein the channel system is arranged and formed in such a way that at least part of the primary coolant can be fed to the heat exchanger via the channel system. A stator coolant, for example, a silicone oil, flows around and/or through the stator sheet package for cooling the stator sheet package, wherein the stator coolant circulates in a circular system between the stator sheet package and the heat exchanger. This is used to dissipate heat from the stator sheet package and to transport it to the heat exchanger. In the heat exchanger, there is a thermal interaction between the stator coolant and the primary coolant, so that at least some of the heat dissipated from the stator sheet package by the stator coolant is transferred to the primary coolant. The stator coolant cooled in the heat exchanger is then fed back to the stator sheet package.

In contrast to common heat exchangers for electric machines, where the heat exchanger is positioned, for example, on the outside of the housing of the respective machine, the heat exchanger described here is integrated within the engine system and in particular within the housing of the stator. Here, the heat exchanger in the stator housing is substantially of an annular form and is arranged coaxially to the also substantially annular stator. In particular, the heat exchanger is arranged before or after the stator sheet package in the axial direction when viewed from the propulsion means, in particular between the propulsion means and the stator sheet package, i.e. in particular not radially inside or outside the sheet metal package, wherein the radii of the heat exchanger and the stator sheet package are essentially the same.

This, i.e. the equality of the radii, is to be understood to mean that in particular the mean radii of the stator sheet package and the heat exchanger are essentially the same. A respective mean radius lies in the middle between the respective inner and outer radius of the respective annular component. The dimensioning of the heat exchanger and the stator sheet package can also be such that when viewed in the axial direction the heat exchanger essentially obscures the stator sheet package and/or vice versa. Due to these various features concerning the arrangement and the dimensioning, the advantage arises that the stator housing and thus also the electric motor assembly can be built comparatively small, especially in the radial direction.

In order to be able to cool the rotor in addition or as an alternative to cooling the stator sheet package, the channel system is formed to guide at least part of the supplied primary coolant via a coolant passage that leads to the magnetic means of the rotor and past the magnetic means.

Advantageously, the coolant passage can include the air gap, so that the coolant can be passed directly past the magnetic means of the rotor, i.e. past permanent magnets, for example.

The coolant passage additionally includes a space in which the primary coolant is recirculated or swirled that is arranged in front of the air gap when looking in the flow direction of the primary coolant.

For a particularly compact design of the electric motor assembly, the means for generating the coolant flow is integrated into the rotor and accordingly generates the coolant flow, especially when the rotor is rotating.

In this case, the rotor may have aerofoil-like devices with which the coolant flow is generated during rotation of the rotor. Alternatively or additionally, the rotor may have a cover section equipped with essentially radially oriented spokes, wherein the spokes are formed to generate the coolant flow during rotation of the rotor. "Essentially radial" also means that the spokes are not at right angles to the rotation axis but are, for example, oriented so that they sweep across an outer surface of a cone during rotation of the rotor.

The rotor may for example be bell-shaped with a cylindrical section extending away from the cover section in a first axial direction, wherein the magnetic means is arranged on the cylindrical section.

The cover section may have an essentially conical shape with a tip and with an imaginary base opposite the tip in the first axial direction, so that during rotation of the rotor the spokes of the rotor substantially sweep across the conical outer surface of the conical shape.

This design allows a particularly compact design and efficient generation of the coolant flow.

Further advantages and embodiments result from the drawings and the corresponding description.

The invention and the exemplary embodiments are explained below in more detail on the basis of drawings. There, the same components in different figures are given the same reference characters.

It should be noted that terms such as "axial", "radial", "tangential" etc. refer to the shaft or axis used in the respective figure or in the example described in each case. In other words, the directions axial, radial, tangential always refer to a rotation axis of the rotor. Here, "axial" describes a direction parallel to the rotation axis, "radial" describes a direction orthogonal to the rotation axis, to or also away from it, and "tangential" is a motion or direction that is at constant radial distance to the rotation axis and for a constant axial position is directed circularly around the rotation axis.

Figure 1:
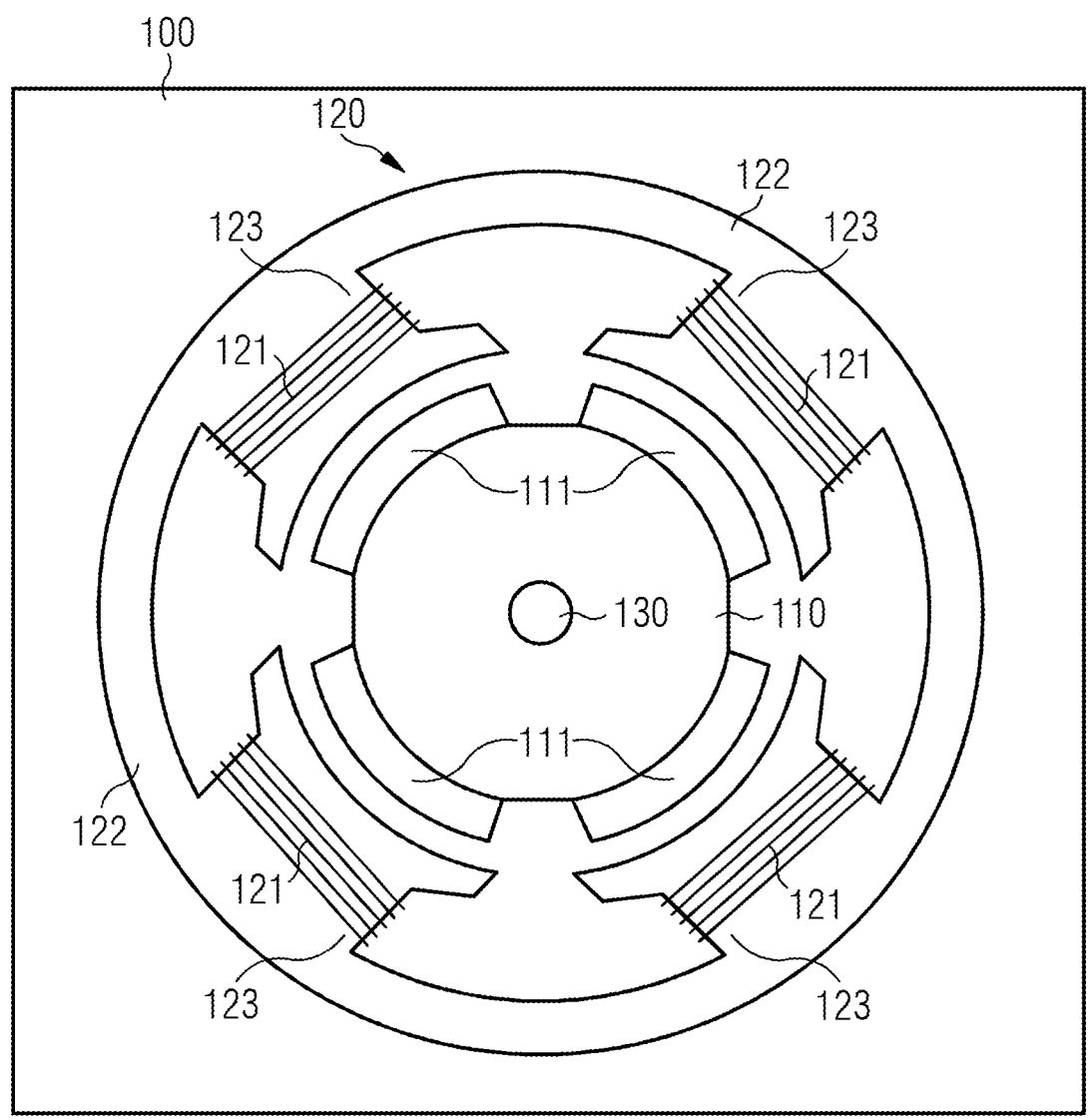
FIG. 1 shows an electric machine.

FIG. 1 shows by way of example an electric machine 100 that is embodied as an electric motor. It should be mentioned that in a similar design the electric machine 100 can basically also be operated as a generator. Furthermore, it should be noted that the structure of the machine described below is greatly simplified and in particular does not show the details described in connection with the other figures but serves only to illustrate the functioning of the electric motor. It can be assumed that the different components of the machine may be arranged differently depending on the formation of the electric machine as a generator or as an electric motor and/or as a radial or axial flow machine with a rotor formed as an internal or as an external rotor etc., for example.

The electric motor 100 comprises a stator 120 as well as a rotor 110 in the form of an inner rotor, wherein the rotor 110 is arranged within the stator 120 and rotates around a rotation axis A when the electric motor 100 is in the operating state. The rotor 110 is rotationally connected to a shaft 130, so that a rotation of the rotor 110 can be transferred via the shaft 130 to a propulsive component that is not shown, for example to a propeller of an aircraft.

The stator 120 has a stator sheet package 122 as well as first magnetic means 121, which can be realized as stator windings 121 on stator teeth 123 of the stator sheet package 122, for example. Each of the windings 121 is formed by an electrical conductor, through which an electric current flows when the electric motor is in the operating state 100. The rotor 110 has a second magnetic means 111, which may be embodied as permanent magnets or as excited or excitable windings, for example. It is assumed below that these are permanent magnets 111. The first and the second magnetic means 111, 121 are embodied and arranged spaced apart from each other by an air gap so that they interact with each other electromagnetically when the electric motor is in the operating state 100. This concept including the conditions for the formation and arrangement of the magnetic means 111, 121 and the rotor 110 and the stator 120 are known in themselves and are therefore not explained in more detail below. It should be mentioned only that in order to operate the electric machine 100 as an electric motor, the stator windings 121 are subjected to an electric current with the help of a power source that is not shown and that causes the windings 121 to produce corresponding magnetic fields that interact electromagnetically with the magnetic fields of the permanent magnets 111 of the rotor 110. This is known to result in the rotor 110 and with it the shaft 130 and the mentioned propeller being rotated in the case of an appropriate design and arrangement of the components mentioned relative to each other.

Figure 2:
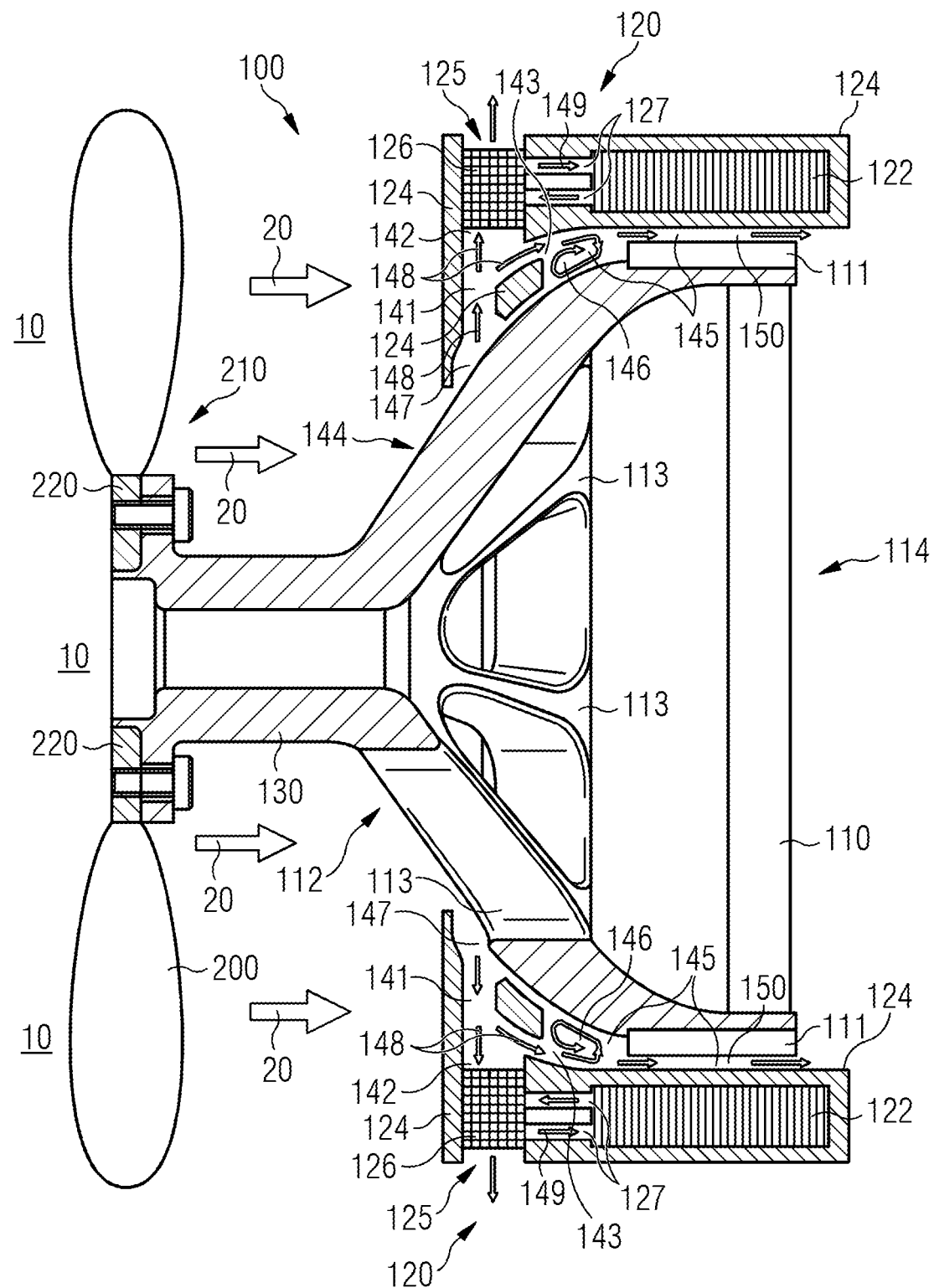
FIG. 2 shows a cross-section of an electric motor assembly according to the invention.

FIG. 2 shows a radial view of a section of an electric motor according to the invention 100, which is based on the functional principle described in connection with FIG. 1 but differs in design from the electric machine of FIG. 1. It should be noted that the stator windings in FIG. 2 are not shown for clarity.

When in the operating state, the electric motor 100 drives a propulsion means 200, for example a propeller. The propeller 200 is connected to the shaft 130 at a connection point 210 with the help of a connection 220, for example with a flange, and is thus connected via the shaft 130 to the rotor 110 of the electric motor 100. In the example shown here, the shaft 130 and the rotor 110 are designed as a single-piece integrated component. The rotor 110 is in particular bell-shaped and has a cover section 112. The cover section 112 comprises a number of spokes 113, which extend in the substantially radial direction away from the shaft 130. The expression "substantially radial" should also include that the spokes 113 are not at right angles to the rotation axis or to the shaft 130, but are oriented, for example, so that they sweep across an outer surface of a straight circular cone or a straight circular cone frustum during rotation of the rotor. Accordingly, the cover section 112 has an essentially conical shape with an imaginary tip and with an imaginary base surface opposite the tip in a first axial direction, so that during rotation of the rotor 110 the spokes 113 of the rotor 110 essentially sweep across the conical outer surface of the conical shape. The bell shape of the rotor 110 also includes a cylindrical section 114 that extends away from the cover section 112 in the first axial direction. The permanent magnets 111 of the rotor are positioned on the cylindrical section 114.

Of the stator 120 of the electric motor 100, only the substantially annular stator sheet package 122 arranged coaxially to the rotor 110 and a stator housing 124 are shown in FIG. 2. The stator teeth 123 of the stator sheet package 122 and the stator windings 121 are not shown for clarity, since the following description in connection with the stator 120 will be in particular related to the fact that the sheet metal package 122 is to be cooled. The teeth 123, which can be regarded as part of the sheet metal package 122 anyway, and the windings 121 do not play a major role in this.

The stator housing 124 is embodied and arranged in such a way that it surrounds the remaining components 121, 122, 123 of the stator 120. In particular, the stator housing 124 houses a stator cooling system 125 in addition to the mentioned components 121, 122, 123. The stator cooling system 125 has a heat exchanger 126 that is connected to the stator sheet package 122 via lines 127. The stator sheet package 122 carries a flow of a stator coolant 149, for example of a silicone oil, wherein as indicated by the arrows the stator coolant 149 circulates via the lines 127 in a circuit between the stator sheet package 122 and the heat exchanger 126. The stator coolant dissipates 149 heat from the stator sheet package 122 and transports it to the heat exchanger 126. In the heat exchanger 126, the comparatively warm stator coolant 149 is brought into thermal contact with another, primary coolant 148 and is cooled down thereby. The stator coolant 149 cooled in this way is then fed back to the stator sheet package 122 in order to cool it further.

The heat exchanger 126 is preferably of an annular form as with the stator sheet package 122 and is arranged coaxially with respect to the rotor 110. The heat exchanger 126 is also located in particular in or on the stator housing 124. When viewed in the axial direction, the heat exchanger 126 is arranged between the propulsion means 200 and the stator sheet package 122, wherein the heat exchanger 126 has substantially the same radius as the stator sheet package 122. This ensures that the electric motor 100, whose size depends mainly on the dimensions of the stator housing 124, can be made comparatively small. A compact design results, in particular in the radial direction, due to the described shape and arrangement of the heat exchanger 126, since the maximum radial dimension is determined by the stator sheet package 122, but not by the heat exchanger 126. In the axial direction, although the stator housing 124 is longer than usual, however, the influence on the total size of the electric motor 100 is less relevant because the heat exchanger 126 that is positioned between the propulsion means 200 and the sheet metal package 122 is arranged in an area that is occupied by the electric motor 100 and in particular by the rotor 110 in any case.

The primary coolant 148, by means of which heat is to be extracted from the stator coolant 149 in the heat exchanger 126, is fed to the heat exchanger 126 in the form of a coolant flow via a first channel 142 of a channel system 141 of a cooling device 140 of the electric motor 100 that is also formed in the stator housing 124. The cooling device 140 also has means 144 for generating the coolant flow of the in particular gaseous primary coolant 148, wherein the channel system 141 formed in the stator housing 124 is arranged and designed to receive the generated coolant flow and to guide it further, for example via the first channel 142 to the heat exchanger 126. The flows of the primary coolant 148 are symbolized by corresponding arrows.

The channel system 141 has at least one further channel 143, via which at least part of the primary coolant 148 for cooling the permanent magnets 111 of the rotor 110 can be derived. For this purpose, a coolant passage 145 is provided, into which the further channel 143 opens, so that the part of the primary coolant 148 supplied via the further channel 143 enters the passage 145. The coolant passage 145 leads to and past the permanent magnets 111 of the rotor 110, so that the part of the primary coolant 148 contributes to the cooling of the permanent magnets 111. The coolant passage 145 includes the air gap 150 formed between the stator 120 and the permanent magnets 111, by means of which the electromagnetic interaction between the stator winding system 121 and the permanent magnets 111 takes place. In addition, the coolant passage 145 may include a space 146 that is arranged in front of the air gap 150 when viewed in the flow direction of the primary coolant 148, in which space 146 the primary coolant 148 is recirculated or swirled before it flows through the air gap 150.

As described, therefore, at least part of the flow of primary coolant 148 provided by the means 144 for generating the coolant flow may pass via the first channel 142 of the channel system 141 to the heat exchanger 126 and may thus contribute to the cooling of the stator 120. Depending on the embodiment of the channel system 141, which may comprise the first channel 142 or the further channel 143 or both channels 142, 143, additionally or alternatively at least some of the provided flow of the primary coolant 148 may be routed through the further channel 143 and via the coolant passage 145 and may thus contribute to the cooling of the permanent magnets 111.

The means 144 for generating the flow of the primary coolant 148 is in particular an integral part of the rotor 110 and accordingly generates the coolant flow in particular when the rotor 110 is rotating. For example, aerofoil-like devices 113 may be provided on the rotor 110, for example on the cover section 112, which cause a flow of the surrounding air available at the rotor 110 position during rotation of the rotor 110, wherein the aerofoil-like devices 113 are arranged on the rotor 110 in such a way that the air flow is directed into an inlet 147 of the channel system 141. The air flow generated in this way thus constitutes the flow of primary coolant 148.

Advantageously, the spokes 113 of the rotor 110 constitute the aerofoil-like devices and thus the means 144 for generating the flow of the primary coolant 148. The spokes 113 are shaped and arranged for this purpose in the manner of a compressor sheet, for example, so that they achieve a radial fan effect when the rotor 110 is rotating and transport the primary coolant 148 to the inlet 147 of the channel system 141.

It should be noted that the aerofoil-like devices 113 may also be provided as separate components in addition to the spokes 113 on the rotor 110. However, this is not shown.

In the simplest case, which is however not shown, the means 144 for generating the flow of the primary coolant 148 may also be realized in the form of one or more guide plates. These are arranged in such a way that the ambient air 20 accelerated by the propeller 200 is transported to the inlet 147 of the channel system 141 by the arrangement of the guide plates alone.

It is common to both embodiments of the means 144 for generating the coolant flow that they rely on the same source of the primary coolant 148, namely the ambient air L that is accelerated in the axial direction when the electric motor 100 of the propulsion means 200, i.e. of the propeller 200, is in the operating state. This air, which is used as the primary coolant 148, which of course may also include a certain, albeit comparatively small and subsequently neglected, proportion of air that does not originate from the propeller 200, is referred to as "bleed air" in connection with the present application. The bleed air and thus the primary coolant 148 are characterized in particular by the fact that they are essentially provided by the rotating propeller 200. Accordingly, the means 144 for generating the coolant flow as well as the entire cooling device 140 are set up to use the bleed air as the primary coolant 148.

The propeller 200, which rotates when in the operating state, sucks ambient air 10 in a known manner and ejects it in the axial direction to the "rear", i.e. in the example shown here towards the electric motor 100, in order to generate the thrust for the vehicle or the aircraft to be driven. The ambient air 10 is typically comparatively cool and advantageously can accordingly be used as the primary coolant 148. Since the ambient air 20, which is now accelerated by the propeller 200, flows essentially in the axial direction, it must be at least partially diverted by the described means 144 to generate the coolant flow in order to pass into the channel system 141 and to function there as the primary coolant 148. The aerofoil-like devices 113 or the correspondingly formed spokes 113 are used for this purpose as also already described.

The cooling device described therefore makes advantageous use of the availability of the usually cool and clean ambient air 10. Due to the fact that the components of the cooling device 140 are largely housed in the stator housing 124, a comparatively small size of the electric motor 100 results as a further advantage.

The invention claimed is:

1. An electric motor assembly for driving a propulsion means, the electric motor assembly including:
    a group of components and a cooling device for cooling at least one of the components, wherein the group includes:
        at least one stator with a stator housing, with a stator sheet package as well as a stator winding arranged on the stator sheet package are arranged in the stator housing,
        a rotor that is rotatable relative to the stator with a magnetic means, wherein the stator winding and the magnetic means interact electromagnetically with each other via an air gap formed between the stator winding and the magnetic means,
    and wherein
        the cooling device comprises a means for generating a coolant flow of a primary coolant,
        the cooling device has a channel system formed in the stator housing for receiving and then carrying the coolant flow to the component to be cooled,
        the cooling device is formed and arranged to use bleed air, which is supplied by the propulsion means, as the primary coolant.

2. The electric motor assembly as claimed in claim 1, wherein the electric motor assembly includes the propulsion means, wherein the rotor is connected to the propulsion means so that the rotor drives the propulsion means when the electric motor assembly is in an operating state, so that at least some of the bleed air to be used as the primary coolant is accelerated by the driven propulsion means to the means for generating the coolant flow.

3. The electric motor assembly as claimed in claim 1, wherein the means for generating the coolant flow is configured to first compress the bleed air supplied thereto and to pass the compressed bleed air to the channel system.

4. The electric motor assembly as claimed in claim 1, and further comprising:
    a heat exchanger integrated within the stator housing, wherein the channel system is configured such that at least part of the primary coolant is fed to the heat exchanger via the channel system,
    wherein:
        a stator coolant flows around and/or through the stator sheet package, wherein the stator coolant circulates in a circuit system between the stator sheet package and the heat exchanger to dissipate heat from the stator sheet package and transport the heat to the heat exchanger,
        the primary coolant and the stator coolant interact thermally with each other in the heat exchanger so that at least some of the heat that is dissipated from the stator sheet package by the stator coolant is transferred to the primary coolant.

5. The electric motor assembly as claimed in claim 4, wherein the heat exchanger is essentially ring-shaped and arranged coaxially with respect to the stator.

6. The electric motor assembly as claimed in claim 5, wherein the heat exchanger is arranged in front of or behind the stator sheet package when viewed in an axial direction, between the propulsion means and the stator sheet package, wherein a radius of the heat exchanger and a radius of the stator sheet package are essentially the same.

7. The electric motor assembly as claimed in claim 1, wherein the channel system is formed to guide at least some of the supplied primary coolant via a coolant passage that leads to the magnetic means of the rotor and past the magnetic means.

8. The electric motor assembly as claimed in claim 7, wherein the coolant passage includes the air gap.

9. The electric motor assembly as claimed in claim 8, wherein the coolant passage includes a space arranged in front of the air gap when viewed in a flow direction of the primary coolant in which the primary coolant is swirled.

10. The electric motor assembly as claimed in claim 1, wherein the means for generating the coolant flow is integrated within the rotor.

11. The electric motor assembly as claimed in claim 10, wherein the rotor has airfoil devices with which the coolant flow is generated when the rotor is rotating.

12. The electric motor assembly as claimed in claim 11, wherein the rotor has a cover section fitted with substantially radially oriented spokes, wherein the spokes constitute and form the airfoil devices in order to generate the coolant flow when the rotor is rotating.

13. The electric motor assembly as claimed in claim 12, wherein the rotor is bell-shaped with a cylindrical section extending away from the cover section in a first axial direction, wherein the magnetic means is arranged on the cylindrical section.

14. The electric motor assembly as claimed in claim 12, wherein the cover section is an essentially conical shape with a tip and with an imaginary base surface opposite the tip in a first axial direction, so that when the rotor is rotating the spokes of the rotor essentially sweep over the conical outer surface of the conical shape.

* * * * *